United States Patent Office.

NATHAN C. McCUTCHEON AND ALEXANDER T. McCUTCHEON, OF SPRINGFIELD, OHIO.

REMEDY FOR KIDNEY DISEASES.

SPECIFICATION forming part of Letters Patent No. 348,854, dated September 7, 1886.

Application filed January 12, 1886. Serial No. 188,292. (No specimens.)

*To all whom it may concern:*

Be it known that we, NATHAN C. McCUTCHEON and ALEXANDER T. McCUTCHEON, subjects of the Queen of Great Britain, residing at Springfield, in the county of Clark and State of Ohio, have jointly invented certain new and useful Improvements in Medicinal Compounds; and we do declare the following to be a full, clear, and exact description of the invention, such as will enable others skilled in the art to which it appertains to make and use the same.

Our invention relates to a new medicinal compounds for diseases of the kidneys in general.

The medicinal compound which we use consists of the following ingredients combined in the proportions herein stated, viz: Take of scoparius or broom as follows: seventy-five per cent., (being of the stalks three-eighths part, of the leaves one-eighth part, of the buds one-eighth part, of the branches one-eighth part;) taraxacum (dandelion) root, one-sixth part; celery-root, one twelfth part. The scoparius (or broom) is first dried until brown in a heated pan. It is then pulverized. The taraxacum (or dandelion-root) and the celery-root are also dried and pulverized, and added to the pulverized scoparia and thoroughly mixed therewith. Of this powdered compound, including the scoparius, taraxacum, and celery, one-half ounce is mixed with one pint of Scotch ale, bottled and thoroughly agitated with the bottle tightly corked. It is then set aside and allowed to settle for about one hour, after which the mixture should be again thoroughly agitated by shaking the bottle. It is then again allowed to settle, and after this it is ready for use. Of this mixture one-third of a pint is taken three times a day by an adult, and a lesser quantity is given to children, in proportion to age. For the Scotch ale water may be used for making a decoction of the ingredients specified. In some extremely low cases, particularly of females and children, where the use of ale might be inadmissible, water may be substituted, in which case the latter should be warm, but not heated beyond 120° to 130°, as with a higher degree of heat the medical properties of the celery will be impaired.

We are aware that scoparia (broom) alone has been used in infusion as a remedy in diseases of the kidneys; but we are not aware that the ingredients of our composition in the proportions stated have ever been used together.

What we claim, and desire to secure by Letters Patent of the United States, is—

The herein-described composition of matter to be used for the treatment of diseases of the kidneys in general, consisting of Scotch ale, scoparius, taraxacum, and celery, in the proportions specified.

In testimony whereof we affix our signatures in presence of two witnesses.

NATHAN C. McCUTCHEON.
ALEXANDER T. McCUTCHEON.

Witnesses:
FRANK RIGHTMYER,
O. B. ZELL.